(12) United States Patent
Chen et al.

(10) Patent No.: US 8,863,601 B2
(45) Date of Patent: Oct. 21, 2014

(54) DEFLECTING DEVICE FOR BALL SCREW DEVICE

(75) Inventors: Hsin Hua Chen, Taichung (TW); Jhe Kun Liou, Taichung (TW)

(73) Assignee: Hiwin Technologies Corp., Situn, Taichung (TW)

(*) Notice: Subject to any disclaimer, the term of this patent is extended or adjusted under 35 U.S.C. 154(b) by 317 days.

(21) Appl. No.: 13/402,999

(22) Filed: Feb. 23, 2012

(65) Prior Publication Data

US 2013/0220046 A1   Aug. 29, 2013

(51) Int. Cl.
*F16H 25/22*   (2006.01)
*F16H 1/24*   (2006.01)

(52) U.S. Cl.
USPC ................................. 74/424.87; 74/424.82

(58) Field of Classification Search
CPC ............ F16H 25/2204; F16H 25/2214; F16H 25/2238; F16H 25/2223; F16H 25/2219; F16H 25/2233; F16H 25/2228; F16H 2025/2242
USPC ......................................... 74/424.81–424.87
See application file for complete search history.

(56) References Cited

U.S. PATENT DOCUMENTS

| | | | | |
|---|---|---|---|---|
| 6,464,034 | B1* | 10/2002 | Toda et al. | 180/444 |
| 6,557,431 | B2* | 5/2003 | Pawlak | 74/424.75 |
| 7,044,017 | B2* | 5/2006 | Cornelius et al. | 74/424.88 |
| 7,185,553 | B2* | 3/2007 | Hayashi | 74/424.86 |
| 7,350,434 | B2* | 4/2008 | Nishimura et al. | 74/424.86 |
| 7,413,051 | B2* | 8/2008 | Okada | 180/444 |
| 7,523,682 | B2 | 4/2009 | Liao et al. | |
| 7,614,318 | B2* | 11/2009 | Husistein | 74/424.87 |
| 7,934,438 | B2 | 5/2011 | Chen et al. | |
| 7,992,461 | B2* | 8/2011 | Lin et al. | 74/424.86 |
| 8,051,736 | B2* | 11/2011 | Chen et al. | 74/424.86 |
| 8,584,546 | B2* | 11/2013 | Fukano et al. | 74/424.87 |
| 2001/0022110 | A1* | 9/2001 | Roland | 74/424.87 |
| 2010/0307271 | A1* | 12/2010 | Hsu et al. | 74/424.82 |

* cited by examiner

*Primary Examiner* — Troy Chambers
*Assistant Examiner* — Jude Agendia
(74) *Attorney, Agent, or Firm* — Charles E. Baxley

(57) ABSTRACT

A ball screw device includes a screw engaged into a nut member for forming two or more endless ball guiding passages and for receiving a number of ball bearing members, the nut member includes two or more conduits and recesses communicative with the helical grooves of the nut member, two deflecting devices are attached to end portions of the nut member and each include an inner member attached to the nut member and having two or more pathways aligned with the recesses of the nut member, and an outer member attached to the inner member and coupled to the inner member with one or more radially extended protrusions for suitably guiding ball bearing members.

4 Claims, 6 Drawing Sheets

DEFLECTING DEVICE FOR BALL SCREW DEVICE

BACKGROUND OF THE INVENTION

1. Field of the Invention

The present invention relates to a deflecting device for a ball screw device, and more particularly to a deflecting device including an anchoring or securing structure or device for suitably anchoring or securing or retaining the deflecting device to the ball screw device and for suitably guiding the ball bearing members to smoothly move through two or more rows of the endless ball guiding passages of the ball screw device.

2. Description of the Prior Art

Typical ball screw devices comprise a nut threaded onto an elongated bolt or screw and rotatable and movable or adjustable along the screw, one or more endless ball guiding passages formed in the ball screw device for slidably receiving ball bearing members, and one or more ball return pipes attached onto the ball screw device for guiding the ball bearing members to smoothly and suitably move through the endless ball guiding passages of the ball screw device.

For example, U.S. Pat. No. 7,523,682 to Liao et al., U.S. Pat. No. 7,934,438 to Chen et al., and U.S. Pat. No. 8,051,736 to Chen et al. disclose several of the typical ball screw return systems each comprising one or more ball return pipes engaged onto a nut for guiding the ball bearing members to smoothly move through the endless ball guiding passage of the ball screw and nut combination.

However, the ball return pipes should be highly supported above the nut with the tube support flanges, and may not be closely or precisely secured to the nut, and the tubular tongues of the ball return pipe may not be precisely directed toward the endless ball guiding passage of the ball screw device. In addition, two or more 90-degree returning angles or sharp returning angles or curvatures will be formed in the endless ball guiding passage of the ball return pipe such that the ball bearing members may not be smoothly moved through the endless ball guiding passage of the ball screw and nut combination.

The present invention has arisen to mitigate and/or obviate the afore-described disadvantages of the conventional ball return devices for the ball screw devices.

SUMMARY OF THE INVENTION

The primary objective of the present invention is to provide a deflecting device including an anchoring or securing structure or device for suitably anchoring or securing or retaining the deflecting device to the ball screw device and for suitably guiding the ball bearing members to smoothly move through the endless ball guiding passages of the ball screw device.

The other objective of the present invention is to provide a deflecting device including an anchoring or securing structure or device for suitably guiding and deflecting or circulating the ball bearing members to smoothly or effectively move through two or more rows of the endless ball guiding passages of the deflecting device.

In accordance with one aspect of the invention, there is provided a ball screw device comprising an elongated screw including a first helical groove and at least one second helical groove formed therein, a nut member including a screw hole formed therein for receiving and engaging with the screw, and including a third helical groove and at least one fourth helical groove for defining the screw hole thereof, and the third and the fourth helical grooves of the nut member being aligned with the first and the second helical grooves of the screw for forming a first endless ball guiding passage and at least one second endless ball guiding passage between the nut member and the screw, the nut member including two end portions, and including a first conduit and at least one second conduit formed through the end portions thereof, and including a first recess and at least one second recess formed in each of the end portions thereof and communicative with the first and the second conduits and the third and the fourth helical grooves of the nut member respectively for forming the first and the second endless ball guiding passages between the nut member and the screw, a number of ball bearing members engaged in the first and the second endless ball guiding passage between the nut member and the screw, and two deflecting devices engaged onto the screw and attached to the end portions of the nut member respectively, the deflecting devices each including a first member attached to the end portion of the nut member and having a first pathway and at least one second pathway formed therein and aligned with the first and the second recesses of the nut member for forming the first and the second endless ball guiding passages, and each including a second member attached to the first member.

The second members of the deflecting devices each include a first depression and at least one second depression formed therein and aligned with the first and the second pathways of the first member for forming the first and the second endless ball guiding passages.

The first member includes at least one projection extended therefrom and engaged with the second member. The second member includes a bore formed therein and defined by an inner peripheral surface for receiving and engaging with the screw, and the projection of the first member is engaged with the inner peripheral surface of the second member.

The first member includes a bore formed therein and defined by an inner peripheral surface for receiving and engaging with the screw, and the projection of the first member is partially extended into the bore of the first member and partially engaged into the first helical groove of the screw. The projection and the inner peripheral surface of the first member include an inscribed circle whose inner diameter (A) is no less than an outer diameter (d) of the screw.

The second member includes at least one protrusion extended therefrom and engaged with the first member. The first member includes a bore formed therein and defined by an inner peripheral surface for receiving and engaging with the screw, and the protrusion of the second member is engaged with the inner peripheral surface of the first member.

The second member includes a bore formed therein and defined by an inner peripheral surface for receiving and engaging with the screw, and the protrusion of the second member is partially extended into the bore of the second member and partially engaged into the second helical groove of the screw. The protrusion and the inner peripheral surface of the second member include an inscribed circle whose inner diameter (B) is no less than an outer diameter (d) of the screw.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
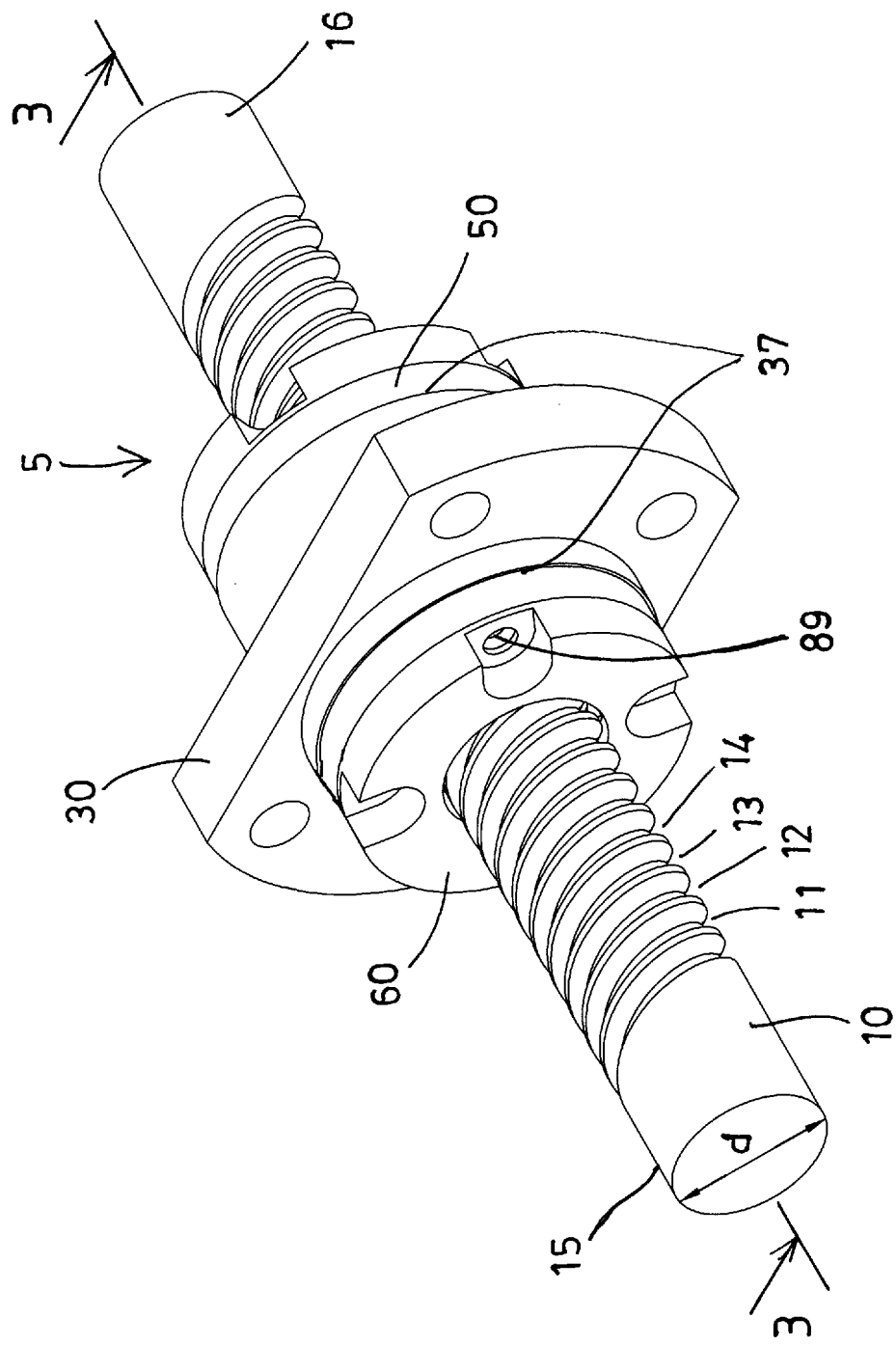
FIG. 1 is a perspective view of a ball screw device including an improved deflecting device in accordance with the present invention.
Figure 2:
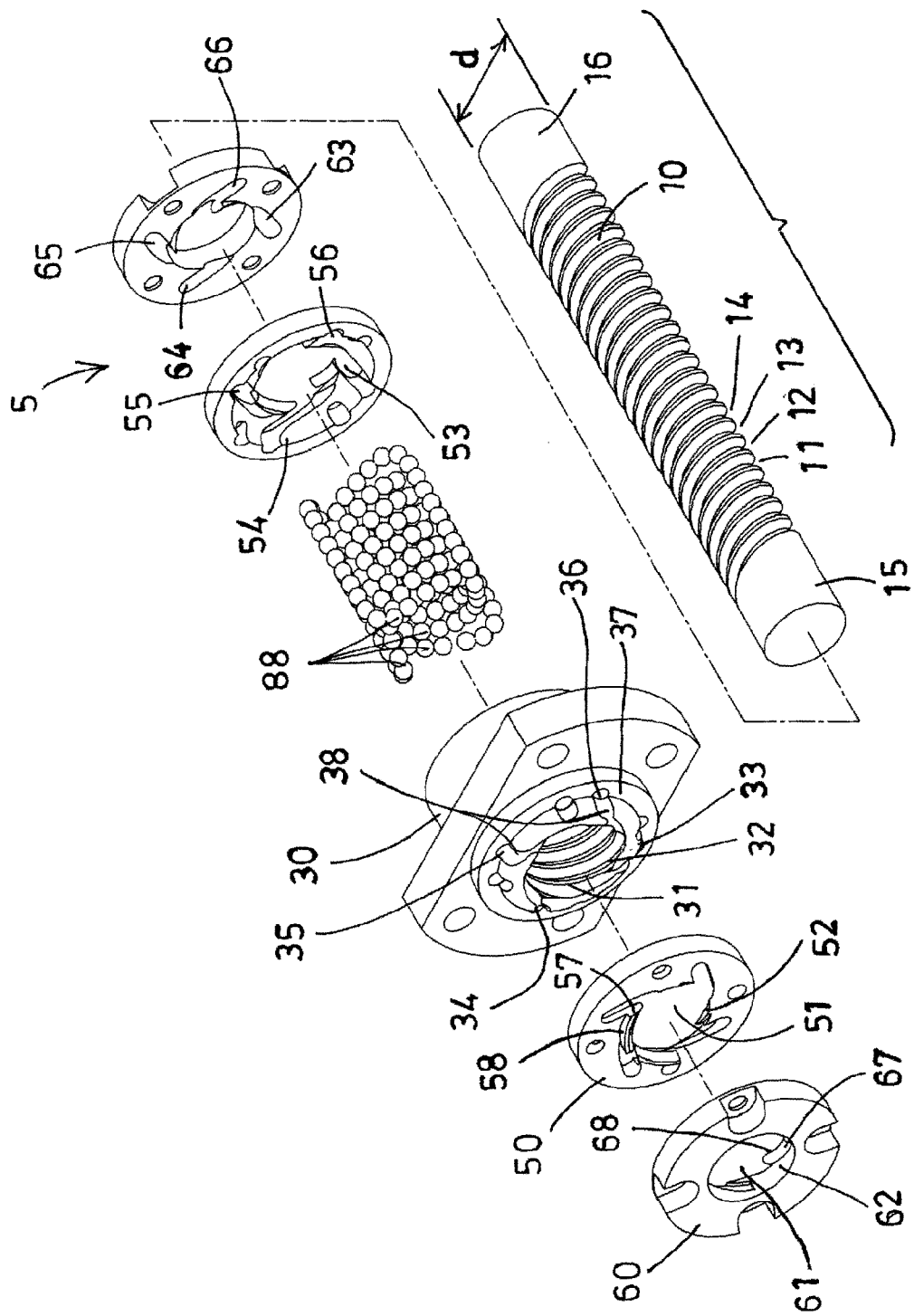
FIG. 2 is a partial exploded view of the ball screw device.

Referring to the drawings, and initially to FIGS. 1-4, a ball screw device in accordance with the present invention comprises an elongated bolt or screw 10 including two or more (such as four) helical threaded portions or grooves 11, 12, 13, 14 formed therein, such as formed on the outer peripheral portion thereof for threading or receiving or engaging with the ball bearing members 88, and including two end portions 15, 16 where no helical threaded portions or grooves formed therein.

The ball screw device further comprises a nut member 30 including a screw hole 31 formed therein, and formed or defined by two or more (such as four) helical threaded portions or grooves 32 for receiving or engaging with the screw 10 and for allowing the nut member 30 to be rotated or adjusted and moved along the screw 10, the helical threaded portions or grooves 32 of the nut member 30 are directed to or aligned with the corresponding helical threaded portions or grooves 11, 12, 13, 14 of the screw 10 for forming or defining two or more endless ball guiding passages 80 in the ball screw device or between the nut member 30 and the screw 10 and for slidably receiving or engaging with the ball bearing members 88 and thus for allowing the nut member 30 to be smoothly rotated and moved along the screw 10.

The nut member 30 further includes two or more (such as four) holes or conduits 33, 34, 35, 36 longitudinally formed therein and formed through the length of the nut member 30 and opened through the two end surfaces or portions 37 thereof and equally spaced from each other, and includes two or more (such as four) curved recesses 38 formed in each of the end portions 37 thereof and communicative with the conduits 33, 34, 35, 36 and the helical threaded portions or grooves 32 of the nut member 30 respectively for forming or defining the endless ball guiding passages 80 in the ball screw device and for allowing the ball bearing members 88 to be guided to suitably move through the conduits 33, 34, 35, 36 and the helical threaded portions or grooves 32 of the nut member 30 respectively.

The ball screw device further comprises two deflecting devices 5 to be disposed or engaged onto the screw 10 and to be disposed or attached or mounted or secured to the end portions 37 of the nut member 30 with latches or fasteners 89 respectively (FIG. 1), the deflecting devices 5 each include a substantially ring or O-shaped structure or configuration having two ring or O-shaped members 50, 60, such as an inner or first member 50 and an outer or second member 60. As shown in FIGS. 2-3 and 5-8, the inner or first members 50 and the outer or second members 60 each include a central opening or bore 51, 61 formed therein, and formed or defined by an inner peripheral surface 52, 62 for receiving or engaging with the screw 10.

The inner or first members 50 each include two or more (such as four) pathways 53, 54, 55, 56 formed therein and equally spaced from each other and directed to or aligned with and communicative with the corresponding curved recesses 38 that are formed in the end portions 37 of the nut member 30 for forming or defining or completing the endless ball guiding passages 80 in the ball screw device, the outer or second members 60 each may further include two or more (such as four) depressions 63, 64, 65, 66 formed therein and equally spaced from each other and directed to or aligned with and communicative with the corresponding pathways 53, 54, 55, 56 of the inner or first members 50 for forming or defining or completing the endless ball guiding passages 80 in the ball screw device.

Figure 3:
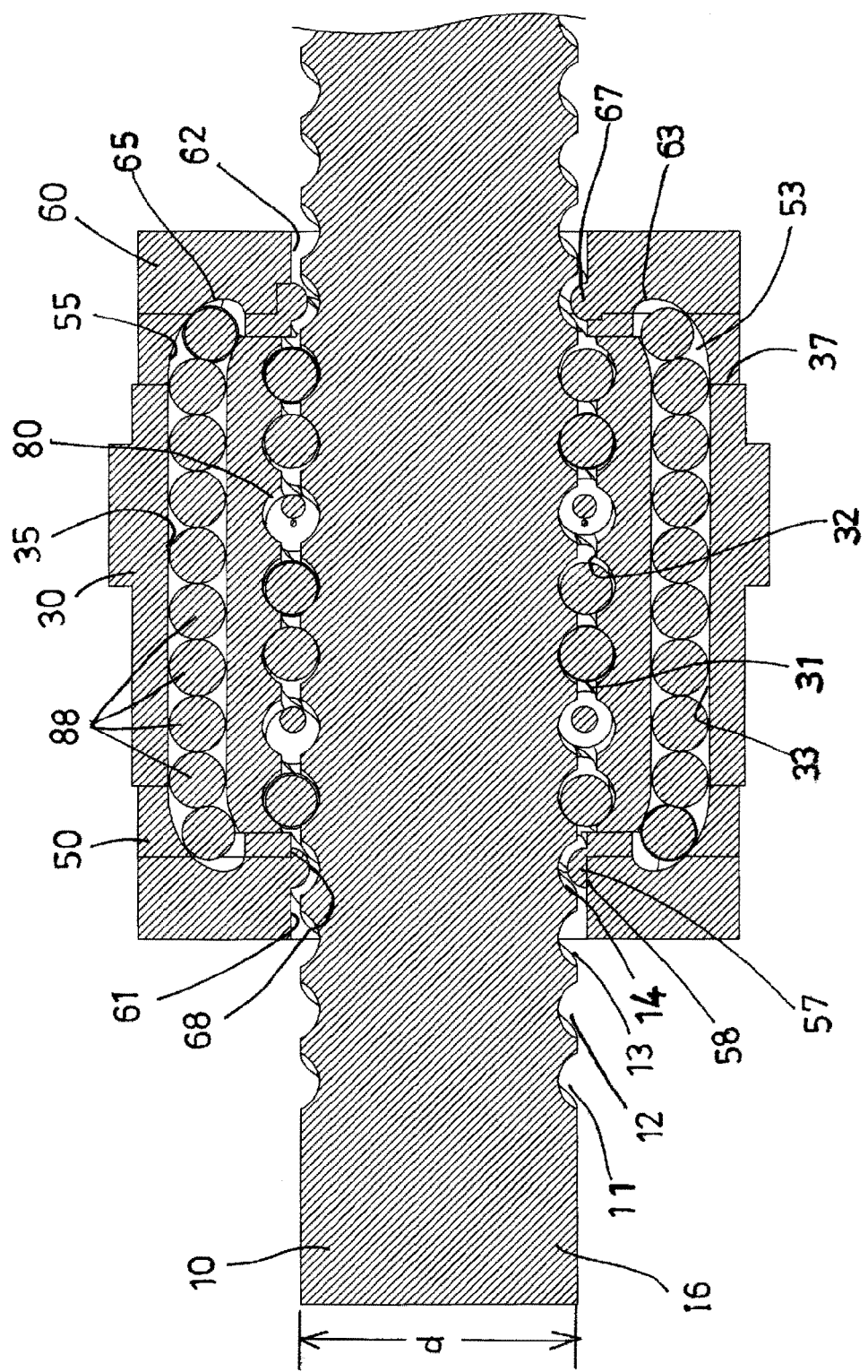
FIG. 3 is a partial cross sectional view of the ball screw device taken along lines 3-3 of FIG. 1.
Figure 4:
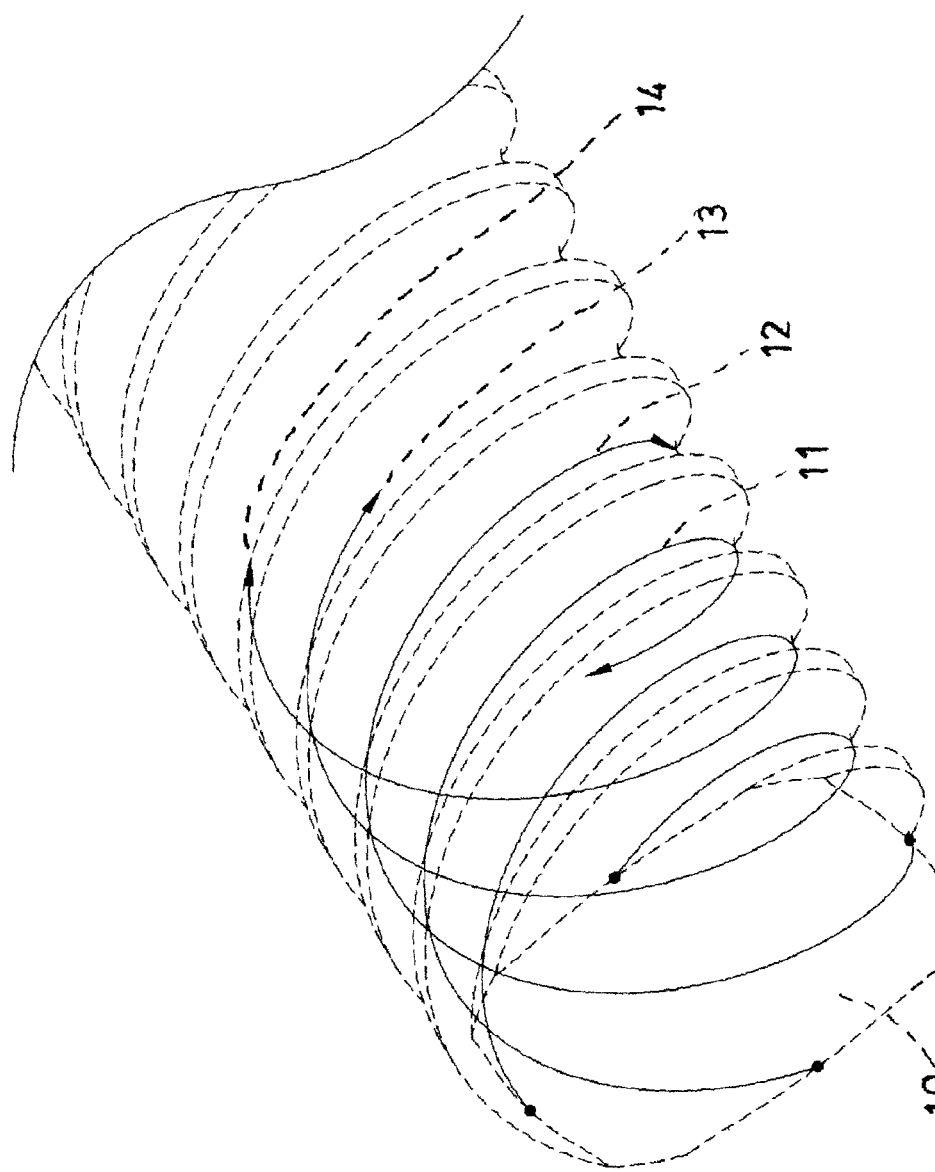
FIG. 4 is a partial perspective view illustrating the four endless ball guiding passages of the ball screw device.
Figure 6:
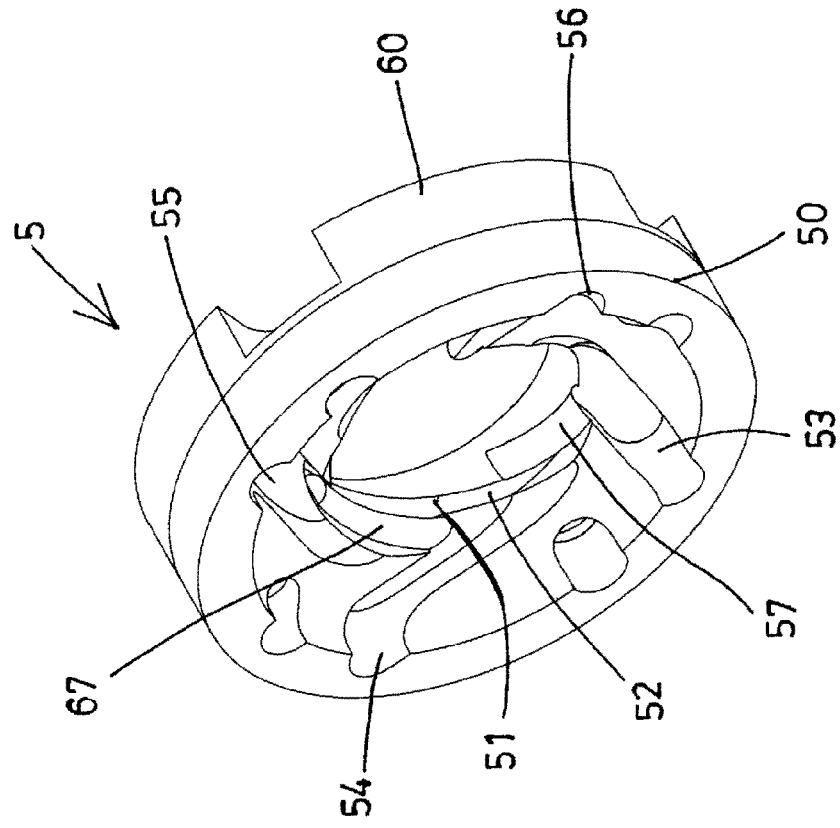
FIG. 6 is a further perspective view illustrating the deflecting device as shown from the opposite direction of the deflecting device.
Figure 5:
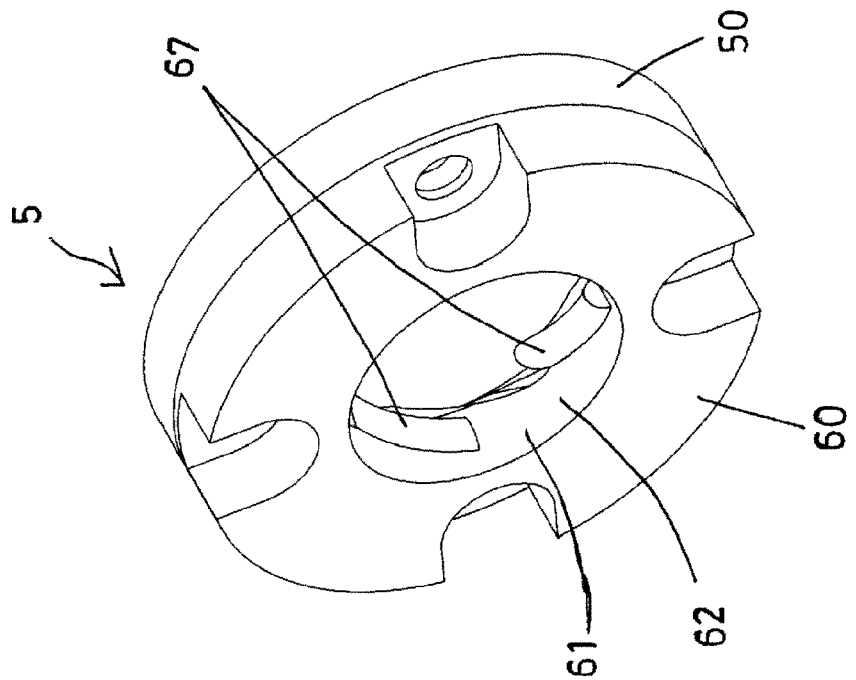
FIG. 5 is another perspective view illustrating one of the deflecting devices of the ball screw device, as shown from one direction of the deflecting device.

The inner or first members 50 each further include one or more (such as two) projections 57 radially and partially extended into the bore 51 thereof and partially and laterally extended outwardly therefrom and partially engaged into the bore 61 of the outer or second member 60 and contacted or engaged with the inner peripheral surface 62 of the outer or second member 60, best shown in FIG. 3, for anchoring or securing or retaining or positioning the inner or first member 50 to the outer or second member 60. The outer or second members 60 each also further include one or more (such as two) protrusions 67 radially and partially extended into the bore 61 thereof and partially and laterally extended outwardly therefrom and partially engaged into the bore 51 of the inner or first member 50 and contacted or engaged with the inner peripheral surface 52 of the inner or first members 50 for further anchoring or securing or retaining or positioning the members 50, 60 together.

The projections 57 of the inner or first members 50 with the protrusions 67 of the outer or second member 60 may be directed toward and radially and partially extended into the respective helical threaded portions or grooves 11, 12, 13, 14 of the screw 10. It is preferable, but not necessarily that the projections 57 of the inner or first members 50 are disposed or located side by side or close to each other, but not arranged opposite to each other, and it is also preferable, but not necessarily that the protrusions 67 of the outer or second member 60 are disposed or located side by side or close to each other, but not arranged opposite to each other. The extension and engagement of the projections 57 of the inner or first members 50 with the outer or second member 60, and the extension and engagement of the protrusions 67 of the outer or second member 60 with the inner or first members 50 may solidly and stably anchor or secure or retain or position the members 50, 60 together.

Figure 8:
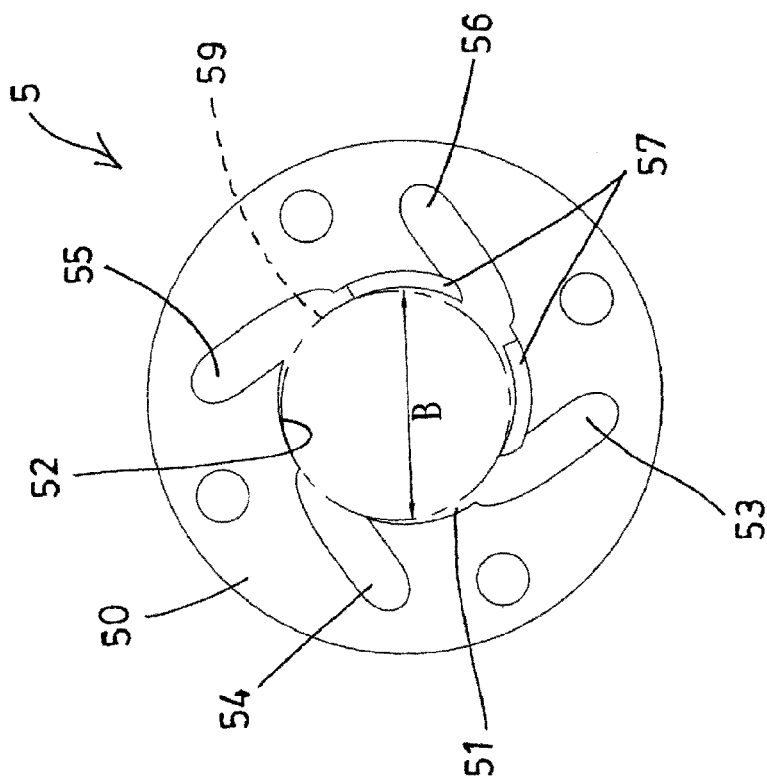
FIG. 8 is another plan schematic view illustrating the other member of the deflecting device of the ball screw device.
Figure 7:
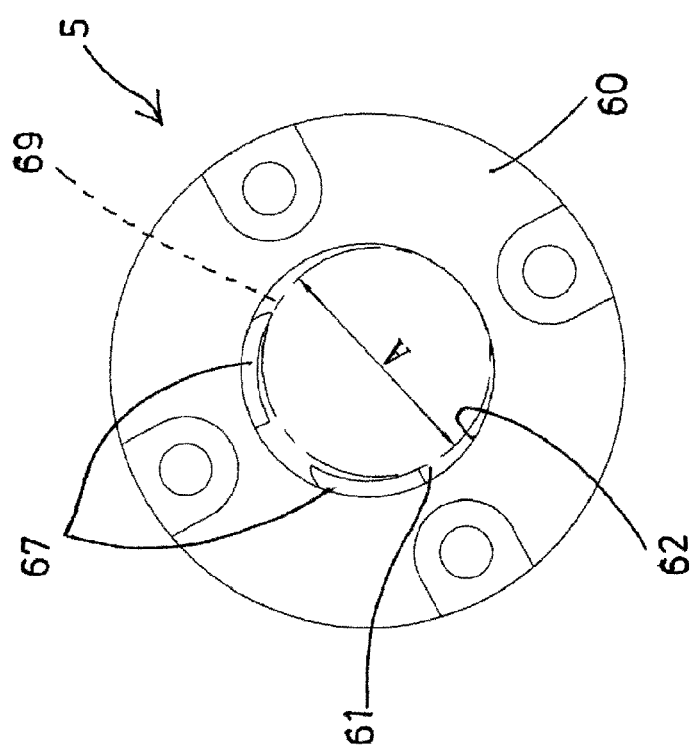
FIG. 7 is a plan schematic view illustrating one of the members of the deflecting device of the ball screw device.

As shown in FIG. 7, the protrusions 67 and the inner peripheral surface 62 of the outer or second member 60 have an inscribed circle 69 whose inner diameter (A) is equal to or greater than or no less than the outer diameter (d) of the screw 10 (FIGS. 1-3) for allowing the outer or second members 60 to be easily and quickly engaged onto the screw 10. Similarly, as shown in FIG. 8, the projections 57 and the inner peripheral surface 52 of the inner or first members 50 have an inscribed circle 59 whose inner diameter (B) is equal to or greater than or no less than the outer diameter (d) of the screw 10 for allowing the inner or first members 50 also to be easily and quickly engaged onto the screw 10.

In operation, the pathways 53, 54, 55, 56 of the inner or first members 50 are aligned with the recesses 38 of the end portions 37 of the nut member 30, and/or the depressions 63, 64, 65, 66 of the outer or second members 60 are aligned with the pathways 53, 54, 55, 56 of the inner or first members 50 for forming or defining or completing the endless ball guiding passages 80 in the ball screw device and for suitably receiving or engaging with the ball bearing members 88. The projections 57 of the inner or first members 50 may be engaged with the outer or second member 60, and the extension and engagement of the protrusions 67 of the outer or second member 60 may be engaged with the inner or first members 50 and may solidly and stably anchor or secure or retain or position the members 50, 60 together.

Accordingly, the deflecting device in accordance with the present invention includes an anchoring or securing structure or device for suitably anchoring or securing or retaining the deflecting device to the ball screw device and for suitably guiding the ball bearing members to smoothly move through the endless ball guiding passages of the ball screw device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A ball screw device comprising:
   an elongated screw including a first helical groove and at least one second helical groove formed therein,
   a nut member including a screw hole formed therein for receiving and engaging with said screw, and including a third helical groove and at least one fourth helical groove for defining said screw hole thereof, and said third and said at least one fourth helical grooves of said nut member being aligned with said first and said at least one second helical grooves of said screw for forming a first endless ball guiding passage and at least one second endless ball guiding passage between said nut member and said screw,
   said nut member including two end portions, and including a first conduit and at least one second conduit formed through said end portions thereof, and including a first recess and at least one second recess formed in each of said end portions thereof and communicative with said first and said at least one second conduits and said third and said at least one fourth helical grooves of said nut member respectively for forming said first and said at least one second endless ball guiding passages between said nut member and said screw,
   a plurality of ball bearing members engaged in said first and said at least one second endless ball guiding passage between said nut member and said screw, and
   two deflecting devices engaged onto said screw and attached to said end portions of said nut member respectively, said deflecting devices each including a first member attached to said end portion of said nut member and having a first pathway and at least one second pathway formed therein and aligned with said first and said at least one second recesses of said nut member for forming said first and said at least one second endless ball guiding passages, and each including a second member attached to said first member,
   said first member including at least one projection extended therefrom and engaged with said second member, said first member including a bore formed therein and defined by an inner peripheral surface for receiving and engaging with said screw, said at least one projection of said first member being partially extended into said bore of said first member and partially engaged into said first helical groove of said screw, said at least one projection and said inner peripheral surface of said first member including an inscribed circle whose inner diameter (A) is no less than an outer diameter (d) of said screw, and
   said second member including at least one protrusion extended therefrom and engaged with said first member, said second member including a bore formed therein and defined by an inner peripheral surface for receiving and engaging with said screw, and said at least one protrusion of said second member being partially extended into said bore of said second member and partially engaged into said at least one second helical groove of said screw, and said at least one protrusion and said inner peripheral surface of said second member including an inscribed circle whose inner diameter (B) is no less than the outer diameter (d) of said screw.

2. The ball screw device as claimed in claim 1, wherein said second members of said deflecting devices each include a first depression and at least one second depression formed therein and aligned with said first and said at least one second pathways of said first member for forming said first and said at least one second endless ball guiding passages.

3. The ball screw device as claimed in claim 1, wherein said at least one projection of said first member is engaged with said inner peripheral surface of said second member.

4. The ball screw device as claimed in claim 1, wherein said at least one protrusion of said second member is engaged with said inner peripheral surface of said first member.

* * * * *